(12) United States Patent
Deen et al.

(10) Patent No.: US 9,454,980 B1
(45) Date of Patent: Sep. 27, 2016

(54) SPIN-SIGNAL ENHANCEMENT IN A LATERAL SPIN VALVE READER

(71) Applicant: Seagate Technology LLC, Cupertino, CA (US)

(72) Inventors: David A. Deen, Edina, MN (US); Taras G. Pokhil, Arden Hills, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/718,406

(22) Filed: May 21, 2015

(51) Int. Cl.
*G11B 5/39* (2006.01)

(52) U.S. Cl.
CPC ........... *G11B 5/3951* (2013.01); *G11B 5/3909* (2013.01); *G11B 5/3912* (2013.01); *G11B 2005/3996* (2013.01)

(58) Field of Classification Search
None
See application file for complete search history.

(56) References Cited

U.S. PATENT DOCUMENTS

| | | | |
|---|---|---|---|
| 7,020,013 | B2 | 3/2006 | Johnson |
| 7,193,891 | B2 | 3/2007 | Johnson |
| 7,209,328 | B2 | 4/2007 | Ito et al. |
| 7,280,322 | B2 | 10/2007 | Takahashi et al. |
| 7,298,597 | B2 | 11/2007 | Carey et al. |
| 7,522,392 | B2 | 4/2009 | Carey et al. |
| 8,072,713 | B2 | 12/2011 | Yamada et al. |
| 8,717,715 | B1 | 5/2014 | Sato et al. |
| 9,042,061 | B2 | 5/2015 | Dimitrov et al. |
| 9,064,509 | B2 | 6/2015 | Dimitrov et al. |
| 2006/0022220 | A1 | 2/2006 | Inomata et al. |
| 2007/0253116 | A1 | 11/2007 | Takahashi |
| 2007/0253121 | A1 | 11/2007 | Yamada et al. |
| 2009/0154030 | A1 | 6/2009 | Yamada et al. |
| 2010/0119875 | A1 | 5/2010 | Sasaki |
| 2010/0296202 | A1* | 11/2010 | Boone, Jr. et al. ...... G11B 5/39 360/313 |
| 2011/0042648 | A1 | 2/2011 | Koo et al. |
| 2015/0029609 | A1* | 1/2015 | Kamiguchi et al. . G11B 5/3909 360/128 |

OTHER PUBLICATIONS

Elliott, R.J., "Theory of the Effect of Spin-Orbit Coupling on Magnetic Resonance in Some Semiconductors", Physical Review, vol. 96, No. 2, Oct. 15, 1954, 14 pages.

Konar, Aniruddha et al., "Tailoring the carrier mobility of semiconductor nanowires by remote dielectrics", Journal of Applied Physics 102, 123705, 2007, America Institute of Physics, 4 pages.

Konar, Aniruddha et al., "Effect of high-k gate dielectrics on charge transport in graphene-based field effect transistors", Physical Review B 82, 115452, 2010, The American Physical Society, 7 pages.

Jena, Debdeep et al., "Enchancement of Carrier Mobility in Semiconductor Nanostructures by Dielectric Engineering", Physical Review Letters, PRL 98, 136805 (2007), The American Physical Society, 4 pages.

Ma, Nan et al., "Charge Scattering and Mobility in Atomically Thin Semiconductors", Physical Review X 4, 011043, 2014, American Physical Society, 9 pages.

(Continued)

*Primary Examiner* — Craig A. Renner
(74) *Attorney, Agent, or Firm* — Westman, Champlin & Koehler, P.A.

(57) ABSTRACT

A lateral spin valve reader that includes a detector structure located proximate to a bearing surface and a spin injection structure located away from the bearing surface. The lateral spin valve reader also includes a channel layer extending from the detector structure to the spin injection structure. An exterior cladding, disposed around the channel layer, suppresses spin-scattering at surfaces of the channel layer.

20 Claims, 11 Drawing Sheets

(56) References Cited

OTHER PUBLICATIONS

Yafet, Y. and Jeffries, C.D. et al., Letters to the Editor, Physical Review, vol. 85, No. 3, Feb. 1, 1952, p. 478, 1 page total.

Griffiths, David J., "Introduction to Electrodynamics, Third Edition", Easter Economy Edition, PHI, Prentice-Hall of India Pricate Limited, New Delhi—110 001, 2005, whole book (579 pages).

* cited by examiner

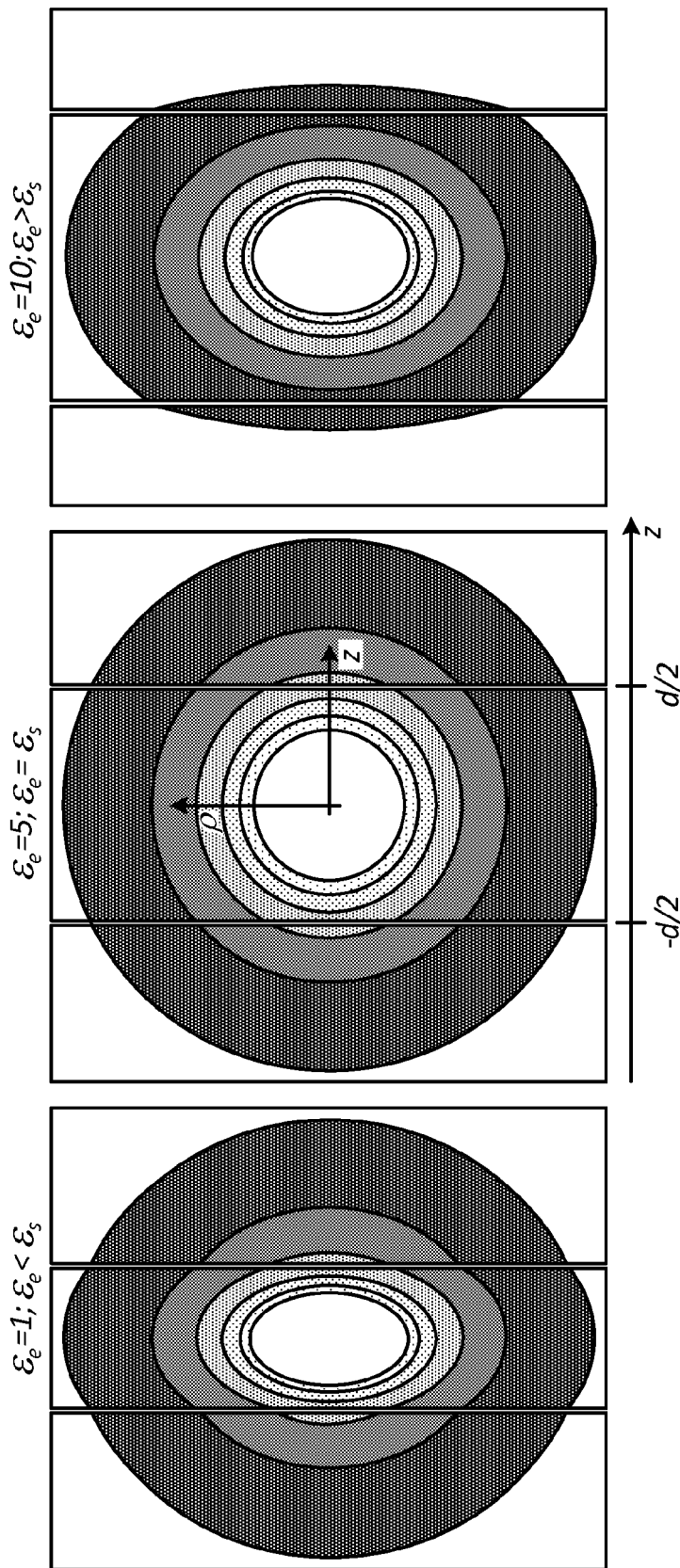

SPIN-SIGNAL ENHANCEMENT IN A LATERAL SPIN VALVE READER

BACKGROUND

Data storage devices commonly have a recording head that includes a read transducer that reads information from a data storage medium and a write transducer that writes information to a data storage medium.

In magnetic data storage devices such as disc drives, a magnetoresistive (MR) sensor such as a Giant Magnetoresistive (GMR) sensor or a Tunnel Junction Magnetoresistive (TMR) sensor has traditionally been employed as the read transducer to read a magnetic signal from the magnetic media. The MR sensor has an electrical resistance that changes in response to an external magnetic field. This change in electrical resistance can be detected by processing circuitry in order to read magnetic data from the adjacent magnetic media.

The ever increasing need for increased data storage necessitates ever increasing data density in magnetic data storage devices. One way to increase data density is to decrease the size and spacing of magnetic bits recorded on the media. The read sensor is generally sandwiched between a pair of magnetic shields, the spacing between which determines the bit length, also referred to as gap thickness. Sensors such as GMR or TMR sensors are constructed as a stack of layers all formed upon one another sandwiched between the magnetic shields. Accordingly, the ability to reduce the spacing between shields with such a sensor structure is limited.

SUMMARY

The present disclosure relates to a lateral spin valve reader that addresses scaling challenges posed by greater data density requirements and includes one or more features that help suppress spin-scattering from the reader. The lateral spin valve reader includes a detector structure located proximate to a bearing surface and a spin injection structure located away from the bearing surface. The lateral spin valve reader also includes a channel layer extending from the detector structure to the spin injection structure. An exterior cladding, disposed around the channel layer, suppresses spin-scattering at surfaces of the channel layer.

Other features and benefits that characterize embodiments of the disclosure will be apparent upon reading the following detailed description and review of the associated drawings.

BRIEF DESCRIPTION OF THE DRAWINGS

FIGS. 4A, 4B and 4C show corresponding plots of scattering potential in a channel in differing dielectric environments.

DETAILED DESCRIPTION OF ILLUSTRATIVE EMBODIMENTS

Magnetic reader embodiments described below relate to lateral spin valve (LSV) readers that include a spin injector, a detector and a channel layer extending from the spin injector to the detector. The spin injector injects electron spins into the channel layer, which transports the spins to the detector. At the detector, the spins aid in detecting bits stored on a magnetic data storage medium. To suppress spin-scattering at surfaces of the channel layer, different embodiments employ an exterior cladding that is disposed around the channel layer. Prior to providing additional details regarding the different embodiments, a description of an illustrative operating environment is provided below.

Figure 1:
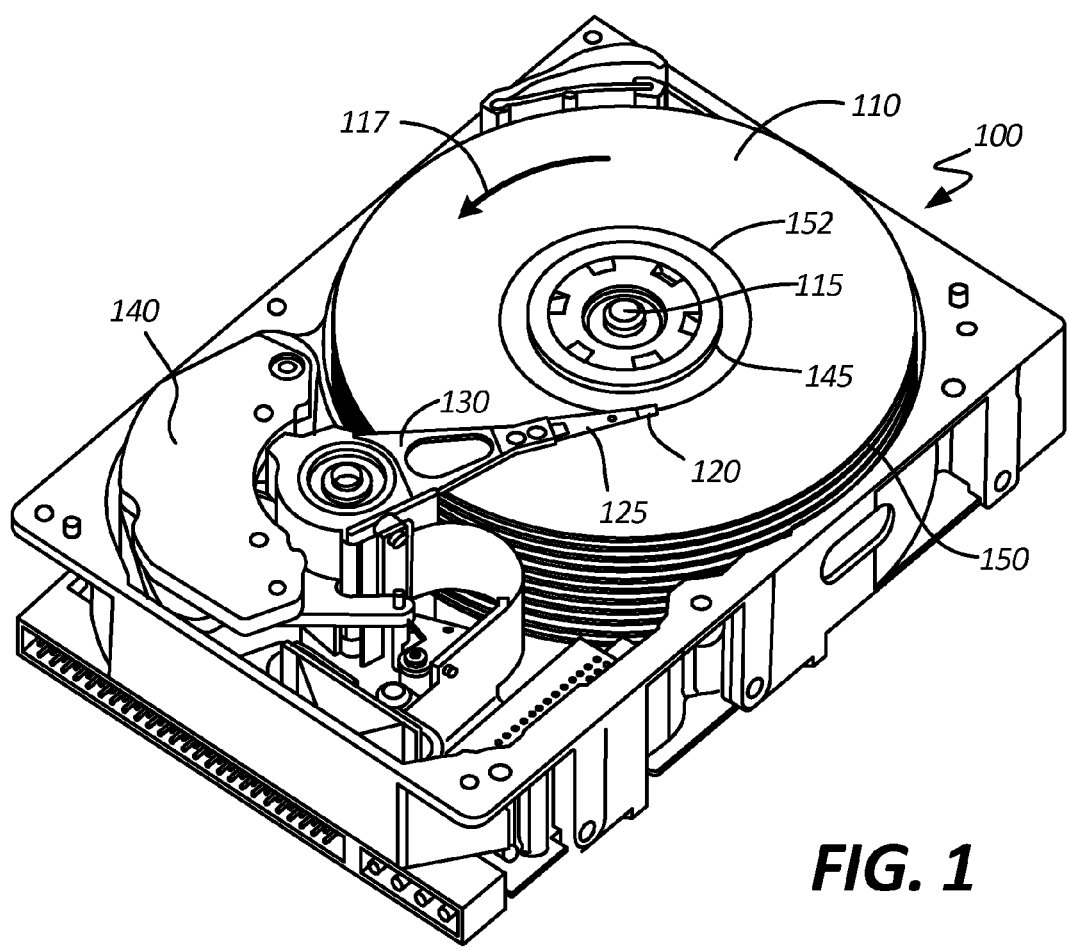
FIG. 1 is a perspective view of a data storage system.
Figure 2:
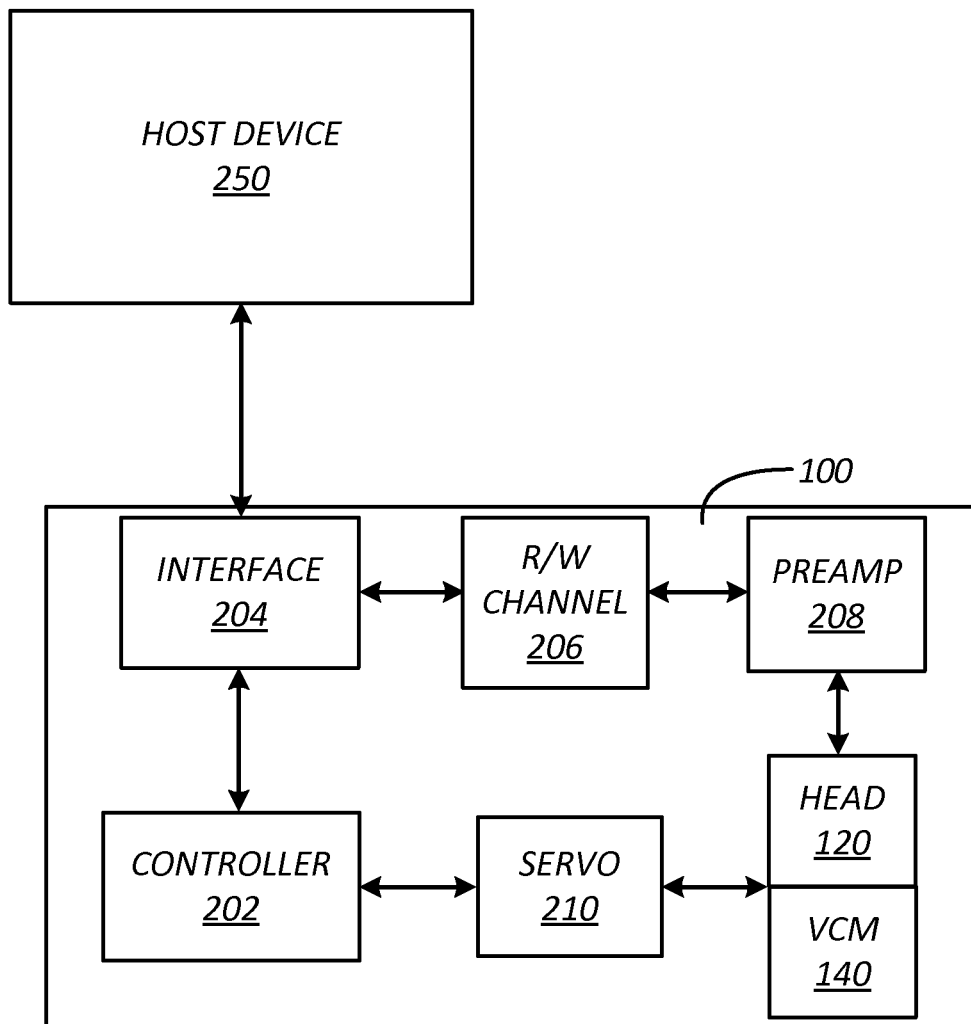
FIG. 2 is a generalized functional block diagram of a data storage system.

FIGS. 1 and 2 together show an illustrative operating environment in which certain specific embodiments disclosed herein may be incorporated. The operating environment shown in FIGS. 1 and 2 is for illustration purposes only. Embodiments of the present disclosure are not limited to any particular operating environment such as the operating environment shown in FIGS. 1 and 2. Embodiments of the present disclosure are illustratively practiced within any number of different types of operating environments.

FIG. 1 is a perspective view of a hard disc drive 100. Hard disc drives are a common type of data storage system. While embodiments of this disclosure are described in terms of disc drives, other types of data storage systems should be considered within the scope of the present disclosure. The same reference numerals are used in different figures for same or similar elements.

Disc drive 100 includes a data storage medium (for example, a magnetic disc) 110. Those skilled in the art will recognize that disc drive 100 can contain a single disc or multiple discs. Medium 110 is mounted on a spindle motor assembly 115 that facilitates rotation of the medium about a central axis. An illustrative direction of rotation is shown by arrow 117. Each disc surface has an associated recording head 120 that carries a read transducer and a write transducer for communication with the surface of the disc. Each head 120 is supported by a head gimbal assembly 125. Each head gimbal assembly (HGA) 125 illustratively includes a suspension and a HGA circuit. Each HGA circuit provides electrical pathways between a recording head and associated hard disc drive electrical components including preamplifiers, controllers, printed circuit boards, or other components. Each suspension mechanically supports an HGA circuit and a recording head 120, and transfers motion from actuator arm 130 to recording head 120. Each actuator arm 130 is rotated about a shaft by a voice coil motor assembly 140. As voice coil motor assembly 140 rotates actuator arm 130, head 120 moves in an arc between a disc inner diameter 145 and a disc outer diameter 150 and may be positioned over a desired track such as 152 to read and/or write data.

FIG. 2 is a generalized block diagram of illustrative control circuitry for the device shown in FIG. 1. The control circuitry includes a processor or controller 202 that directs or manages the high level operations of device 100. An interface circuit 204 facilitates communication between device 100 and a host device 250. A read/write channel 206 operates in conjunction with a preamplifier/driver circuit (preamp) 208 to write data to and to read data from a data storage medium such as medium 110 in FIG. 1. Preamp 208 also optionally acts as a power supply to electrical components included in a recording head such as a read transducer, a write transducer, heaters, etc. Preamp 208 is illustratively electrically connected to recording head 120 through a HGA circuit that is connected to preamp 208 and to one or more recording head 120 electrical connection points. A servo circuit 210 provides closed loop positional control for voice coil motor 140 that positions recording head 120.

Figure 3A:
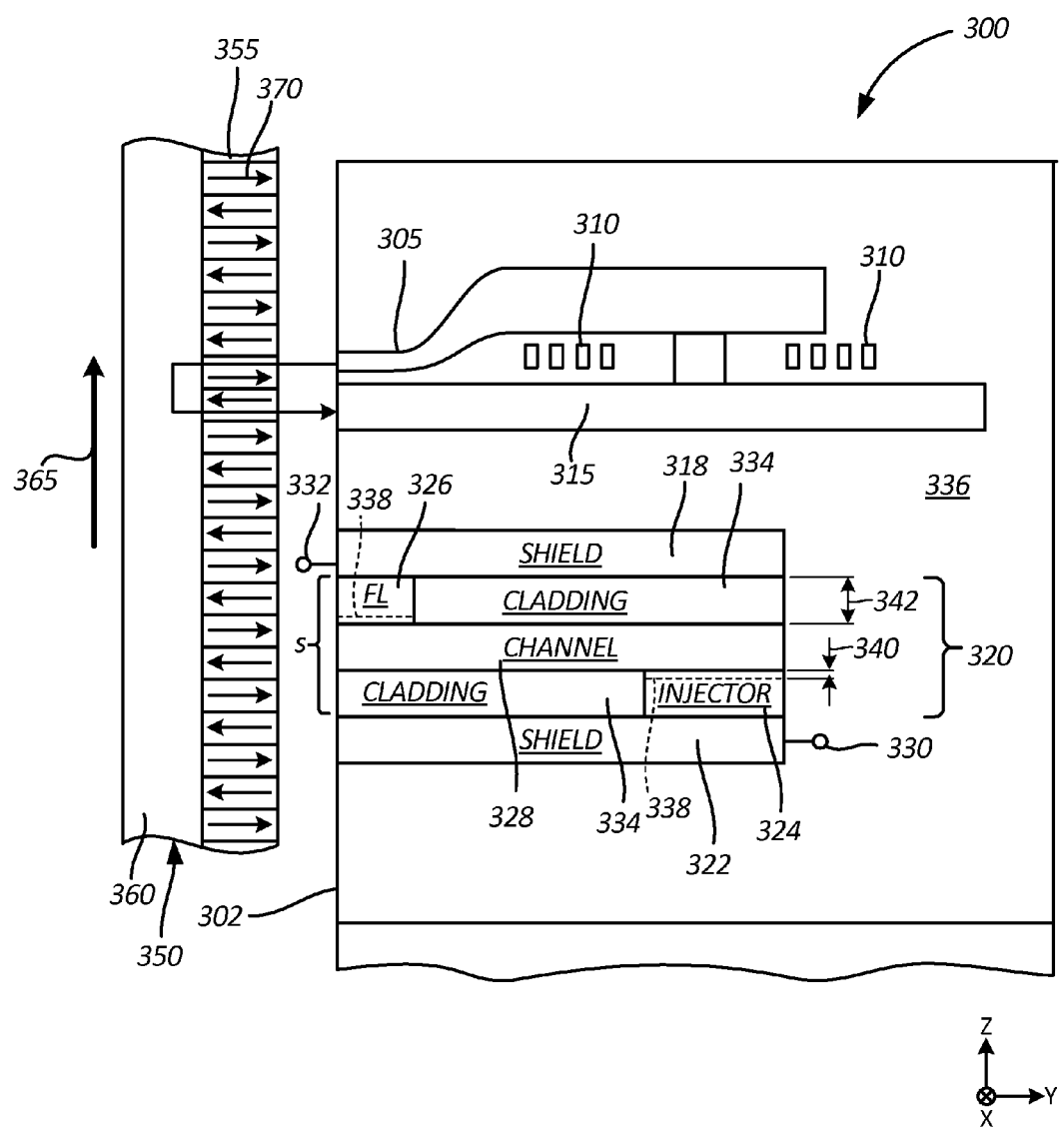
FIG. 3A is a schematic diagram of a cross-section of one embodiment of a recording head that reads from and writes to a storage medium.

FIG. 3A is a schematic diagram showing a cross-sectional view of portions of a recording head 300 and a data storage medium 350 taken along a plane substantially normal to a plane of a bearing surface (for example, an air bearing surface (ABS)) 302 of recording head 300. The recording head elements shown in FIG. 3A are illustratively included in a recording head such as recording head 120 in FIGS. 1 and 2. Medium 350 is illustratively a data storage medium such as medium 110 in FIG. 1. Those skilled in the art will recognize that recording heads and recording media commonly include other components. Embodiments of the present disclosure are not limited to any particular recording heads or media. Embodiments of the present disclosure may be practiced in different types of recording heads and media.

Recording head 300 includes a write pole 305, a magnetization coil 310, a return pole 315, a top shield 318, a read transducer 320, a bottom shield 322 and a wafer overcoat 336. Storage medium 350 includes a recording layer 355 and an underlayer 360. Storage medium 350 rotates in the direction shown by arrow 365. Arrow 365 is illustratively a direction of rotation such as arrow 117 in FIG. 1.

In an embodiment, electric current is passed through coil 310 to generate a magnetic field. The magnetic field passes from write pole 305, through recording layer 355, into underlayer 360, and across to return pole 315. The magnetic field illustratively records a magnetization pattern 370 in recording layer 355. Read transducer 320 senses or detects magnetization patterns in recording layer 355, and is used in retrieving information previously recorded to layer 355.

In the embodiment shown in FIG. 3A, read transducer 320 is a LSV reader. LSV reader 320 includes a spin injector 324, a detector 326 and a channel layer 328 that extends from spin injector 324 to detector 326.

The spin injector 324 may include an electrically conductive, magnetic layer (not separately shown) that has a magnetization that is pinned in a direction (preferably perpendicular to the bearing surface). Pinning of the magnetization of the pinned magnetic layer may be achieved by, for example, exchange coupling with a layer of anti-ferromagnetic material (not separately shown).

The detector 326 may include a magnetic, electrically conductive layer having a magnetization that is free to move in response to a magnetic field, and can therefore be referred to herein as a free layer (FL). Injector 324 and/or detector 326 may be separated from channel layer 328 by a thin electrically insulating barrier layer 338. A thickness of barrier layer 338 is denoted by reference numeral 340.

The portion of LSV reader 320 proximate to the bearing surface 302 does not include relatively thick synthetic antiferromagnetic (SAF) and antiferromagnetic (AFM) stacks that are typically present in, for example, current perpendicular-to-plane (CPP) Tunnel Junction Magnetoresistive (TMR) readers. Therefore, a spacing between top shield 318 and bottom shield 322 of LSV reader 320, which is denoted by s, is substantially less than a shield-to shield spacing in, for example, a CPP TMR reader. It should be noted that, in the interest of simplification, shield-to-shield spacing s in the Z-axis direction in FIG. 3A is shown as being uniform along a length (in the Y-axis direction) of LSV reader 320. However, in different embodiments, to accommodate a multi-layered injector 324, a shield-to-shied spacing away from the bearing surface 302 may be substantially greater than the shield-shield spacing s proximate to the bearing surface 302.

For allowing a detection current to flow to detector 326, spin injector 324 is connected to a current source (not shown) via terminal 330. Detector 326 is connected to a suitable voltage measuring device (not shown) via terminal 332.

First, the detection current from the current source is made to flow through the spin injector 324 and through the channel layer 328. This flow of current causes electron spins to accumulate in channel layer 328, which then transports the spins to the detector 326.

When the spins are transported to the detector 326, an electric potential difference, which varies depending upon an external magnetic field, appears between the detector 326 and the channel layer 328. The voltage measuring device detects electric potential difference appearing between the detector 326 and the channel layer 328. In this manner, the LSV reader 320 can be applied as an external magnetic field sensor for detecting bits stored on a magnetic data storage medium such as 350.

Figure 3B:
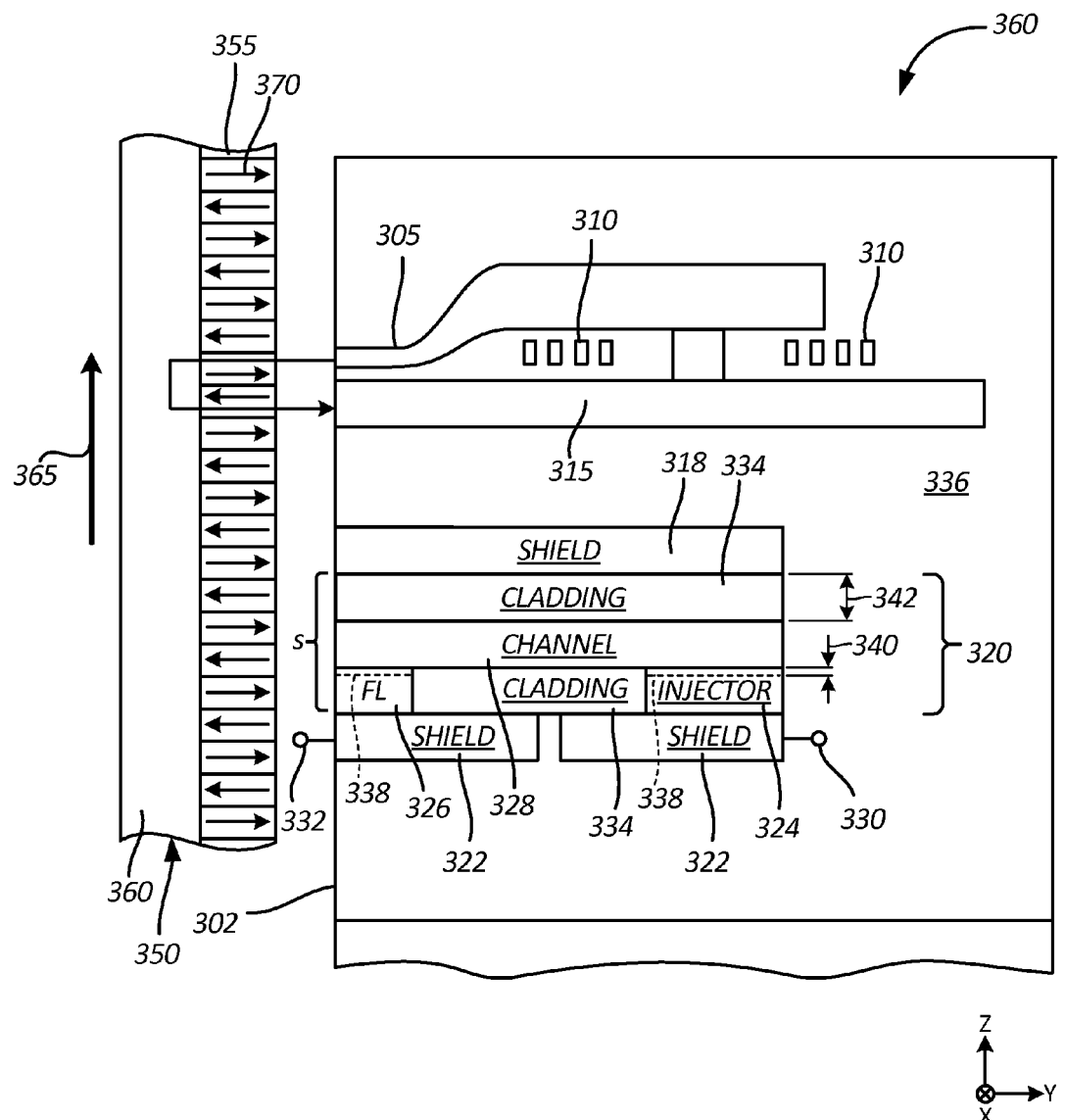
FIG. 3B is a schematic diagram of a cross-section of another embodiment of a recording head that reads from and writes to a storage medium.
Figure 3C:
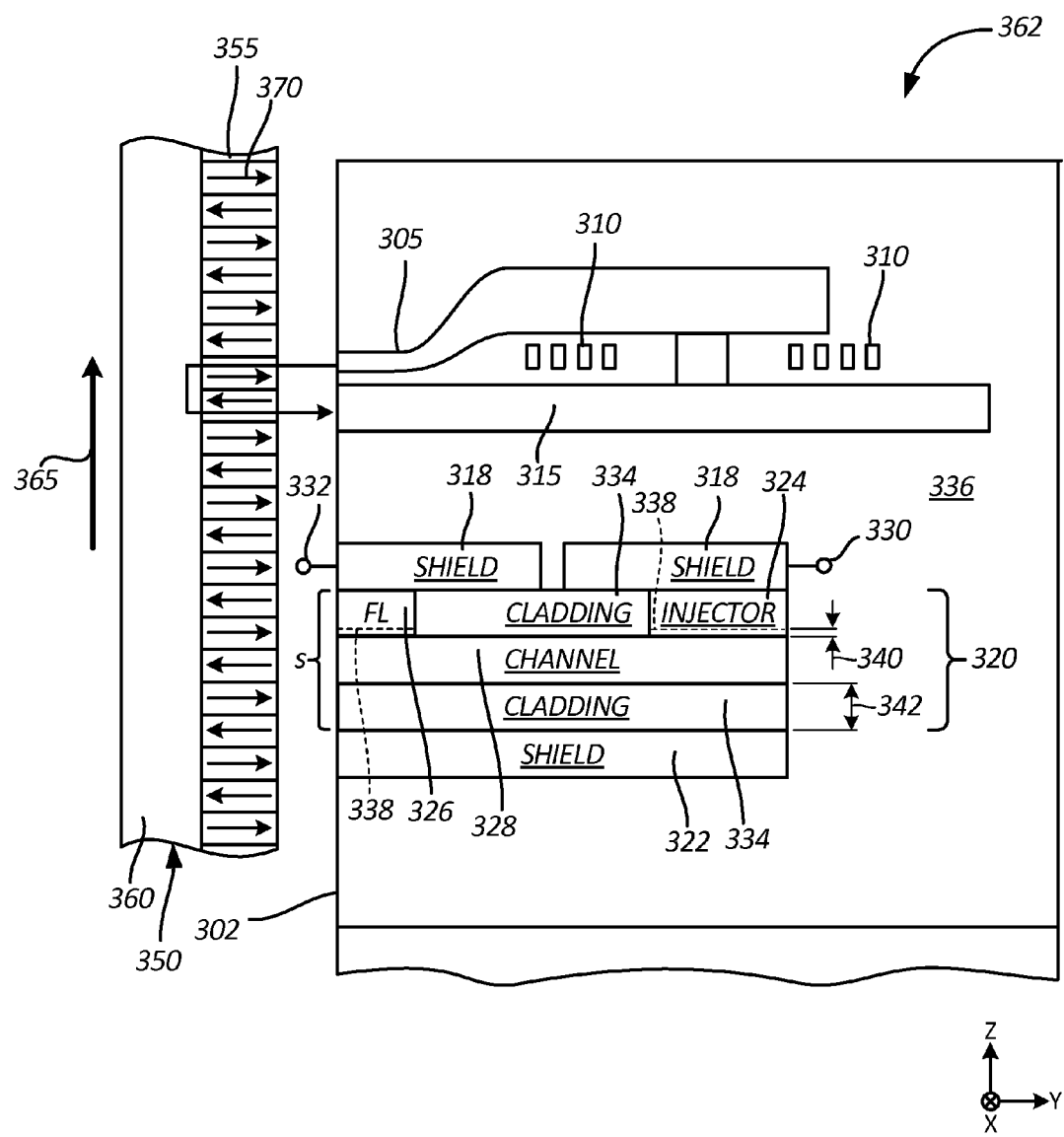
FIG. 3C is a schematic diagram of a cross-section of yet another embodiment of a recording head that reads from and writes to a storage medium.

As noted above, to suppress spin-scattering at surfaces of the channel layer, different embodiments employ an exterior cladding (such as 334) that is disposed around the channel layer 328. A thickness of cladding layer 334 is denoted by reference numeral 342. FIG. 3B shows another embodiment of a recording head denoted by reference numeral 360. Other than injector 324 and detector 326 being on a same side of channel layer 328 in recording head 360 and bottom shield 322 being separated into two electrically-isolated portions, recording head 360 is substantially similar to recording head 300. FIG. 3C shows yet another embodiment of a recording head denoted by reference numeral 362. Recording head 362 is substantially similar to recording head 360 (of FIG. 3B), but includes injector 324 and detector 326 above channel layer 328 instead of below the channel layer 328 as in recording head 360 (of FIG. 3B). Like recording head 300, recording heads 360 and 362 employ an exterior cladding 334 to suppress spin-scattering at surfaces of the channel layer 328. It should be noted that cladding 334 is included as a separate element that is present in addition to wafer overcoat 336. Details regarding spin-scattering and how spin scattering is addressed are provided below.

As indicated above, a LSV reader inherently relies on the traversal of a spin-coherent (polarized) current from an injector lead into and across a non-magnetic channel layer and finally measured at a detector lead. The traversal of spin current across the channel medium encounters various scattering centers that scatter electron momentum. The scattering randomizes the electron spins (also termed de-coherence or spin-flipping). The effect of the randomization of electron spin in the LSV channel is fewer spin-coherent electrons that make it to the detector contact, which ultimately results in a diminished signal level at the detector lead. Therefore, the minimization of spin-scattering in the LSV channel is essential to help maximize the reader signal level regardless of the LSV topology. Some of these scattering centers/mechanisms are extrinsic (impurity, roughness and surfaces) and may be suppressed by using suitable device engineering techniques. Others are material dependent (phonon, alloy, dislocation) and set intrinsic limits to a spin mean free path ($l_s = \sqrt{D\tau_s}$) where D is a diffusion constant and $\tau_s$ is a spin relaxation time. One example is the presence of an impurity within or surrounding the spin-channel that scatters spin by coulomb interaction. The scattering potential, $V_{coul}$, is given by:

$$V_{coul}(\rho, z) = \sum_{n=-\infty}^{\infty} \frac{q\gamma^{|n|}}{4\pi\epsilon_2\epsilon_0 \sqrt{\rho^2 + |z - z_n|^2}} \quad \text{Equation 1}$$

where q is the elemental charge constant, $\gamma = (\epsilon_s - \epsilon_e)/(\epsilon_s + \epsilon_e)$, where $\epsilon_s$ is a permittivity of the channel and $\epsilon_e$ is a permittivity of an environment of the channel, gives a measure of dielectric mismatch between the channel and the dielectric environment, L is a permittivity of free space measured in farads per meter (F/m) or $A^2 \cdot s^4 \cdot kg^{-1} \cdot m^{-3}$ (where A is current in amperes, s is time in seconds, kg is mass in kilograms and m is length in meters), $\rho$ is the in-plane space vector in the channel, and z is the direction of channel thickness with $z_n = nd$ where d is channel width and $n = \pm 1, \pm 2 \ldots$. A purpose for outlining the coulomb scattering potential is to show that it is inversely proportional to a relative dielectric constant ($\epsilon_s$ or $\epsilon_e$) which is variable with the dielectric environment of the spin-channel. A discussion within the context of the LSV is given below. The technique described below provides a solution to suppress at least some of the extrinsic spin scattering in order to maximize the detected signal of a LSV-based magnetic reader.

The LSV reader signal is dependent on the diffusion of electron polarized electron spins and therefore the spin diffusion length, $\lambda_s$, is the central quantity of interest and is defined as, $$\lambda_s = \sqrt{D\tau_s} \quad \text{Equation 2}$$

where D is the diffusion length in the conduction medium (LSV channel) and $\tau_s$ is the spin scattering length and is related to the momentum relaxation time in metals and semiconductors by:

$$\tau_s = \alpha \tau_m \quad \text{Equation 3}$$

where $\tau_m$ is the momentum relaxation time and $\alpha$ is a weighting constant that relates momentum and spin scattering times to properties of a band structure (spin orbit coupling parameter) of the material. The momentum relaxation time is also a critical component in setting the conductivity of a material, which is given by the Drude relationship, $$\sigma = \frac{qN\tau_m}{m^*} \quad \text{Equation 4}$$

where N is the charge density, and $m^*$ is the effective mass of the electron moving through the periodic crystal lattice. The (total) momentum relaxation time may be related to individual relaxation times via Matthiessen's rule, $$\frac{1}{\tau_m} = \sum_i \frac{1}{\tau_i} \quad \text{Equation 5}$$

such that individual scattering mechanisms may be considered separately and incorporated into the conglomerate (i.e., total) momentum relaxation time and therefore the spin-relaxation time. This methodology gives a substantially accurate approximation for the calculation of the individual spin-relaxation times and their total contribution to the spin diffusion length that determines the LSV detection signal.

One technique to reduce spin scattering is to fully clad the LSV channel with a high dielectric constant, non-magnetic, non-conductive material for spin-scattering suppression which leads to higher spin-conductivity (drift and/or diffusion) and thus, a higher reader signal for scaled (thin) channels. For low-dimensional (single nanometers-10 nanometers) systems, electron transport is enhanced by cladding the conduction channel by a judiciously chosen dielectric material. That is, by surrounding the conduction channel of an electronic device with a dielectric cladding, surface or remote ionized charge that may interact with the conduction electrons by coulomb interaction may be suppressed via the modification of the electric field through the dielectric environment. The suppression is due to the boundary condition at the interface of the channel and dielectric that causes a discontinuity in the fields that depend on the dielectric mismatch.

For illustration purposes of the screening effect, the scattering potential in Equation 1 may be considered for a charged point defect centered in the channel. FIGS. 4A, 4B and 4C show corresponding plots of coulomb potentials in a channel and how the channel is manipulated by a dielectric environment. The channel thickness is in the z-direction and the in-plane dimensions are in the x- and y-directions (indicated by $\rho$ in FIG. 4B). The channel is of sufficiently small width ($\leq 10$ nm) so that the dielectric material imposes a hard-wall confining potential such that the spin-polarized conduction electrons within the channel are (quantum) confined to only the channel region. Under these conditions, the momentum scattering time, and therefore conductivity, may be derived by perturbation methods as indicated in equations included above. As shown in FIG. 4A, a dielectric permittivity less than that of the channel causes spreading or leakage of the potential contour of the scattering potential, giving it a longer range interaction within and out of the channel. If the dielectric constant of the channel is matched to its environment, as in FIG. 4B, the potential spreading is as if no confinement in the channel exists. In FIG. 4B, the channel thickness is d (i.e., $-d/2$ to $d/2$). For the case where the environment bestows a higher dielectric constant than the channel material, the coulomb interaction is suppressed by the environment and therefore the scattering potential inside the channel is damped (FIG. 4C). Taking advantage of this fact for the LSV reader, cladding the reader with a high dielectric constant material allows for diminished coulomb scattering within the conduction channel and therefore spin scattering is also suppressed.

A dielectric environment plays a critical role in setting carrier mobility in low-dimensional semiconductor channels. For extremely scaled (thin) two-dimensional carbon channels, surface phonon coupling at the conduction channel/dielectric interface may also play a strong role in determining the variety of dielectric. Since the LSV channel serves as the primary scaling element, it is suitable to employ such materials as low-dimensional semiconductors, two-dimensional carbon crystalline films, and the transition-metal dichalcogenides as these systems are all substantially ideally suited for geometric scaling and long spin mean free paths.

Figure 5:
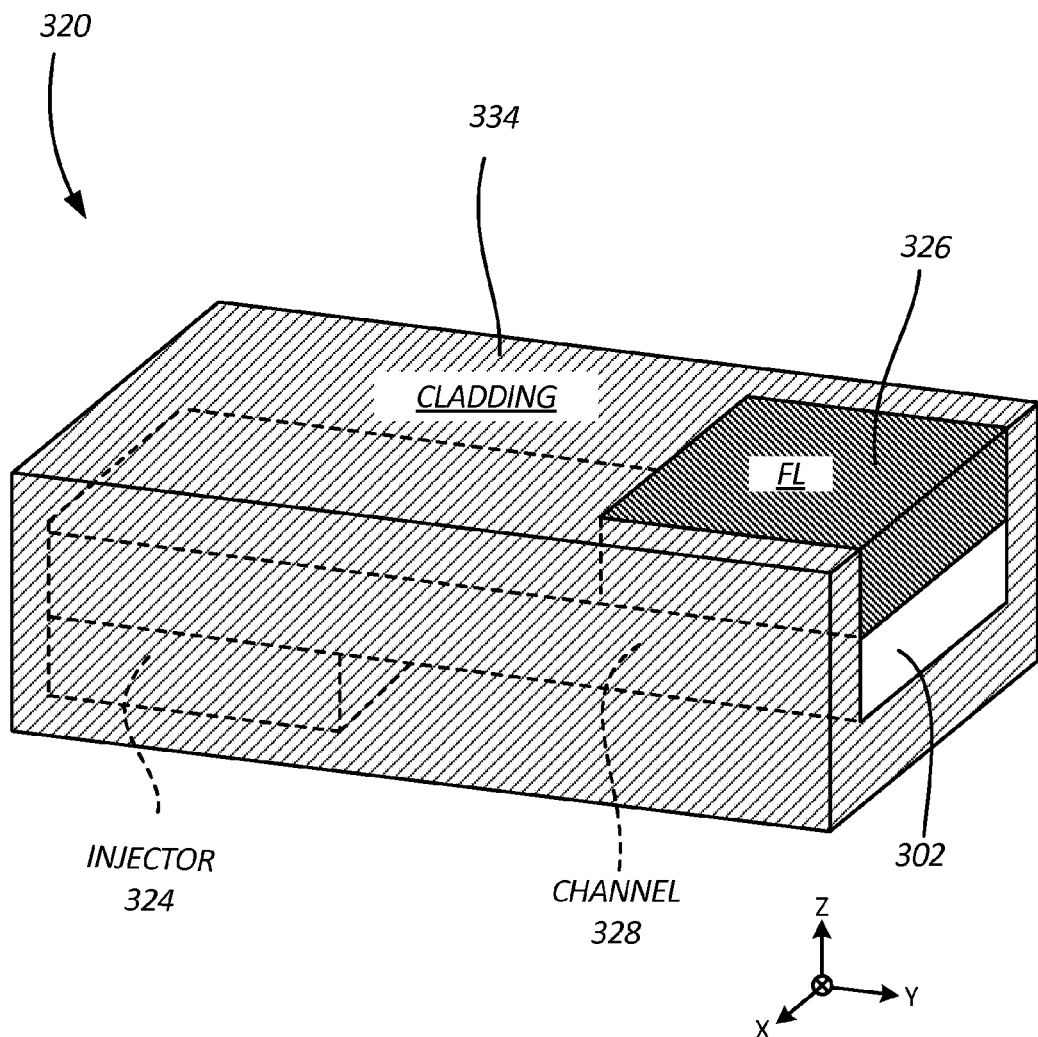
FIG. 5 is a schematic perspective view of a lateral spin valve reader in accordance with one embodiment.

FIG. 5 is a schematic perspective view of LSV reader 320 of FIG. 3A. As noted earlier, LSV read 320 includes injector 324, detector 326, channel layer 328 and cladding 334. As can be seen in FIG. 5, substantially all surfaces of channel layer 328, other than the bearing surface portion and surface portions that interface with injector 324 and detector 326, are encapsulated with cladding 334, which may comprise a suitable type of dielectric material described further below. In some embodiments, only top and bottom surfaces of channel layer 328 may be covered by cladding 334. It should be noted that the Z-axis direction is perpendicular to the top and bottom surfaces of channel layer 328. The dielectric material can be atomic layer deposited, chemical vapor deposited, or any solid/crystal material deposition method may also be utilized. It is desirable that the deposition method yield conformal dielectric coverage in terms of convenience for side-wall coverage but may depend on the overall process. Similar dielectric cladding 334 may be provided for readers 320 in FIGS. 3B and 3C.

Figure 6A:
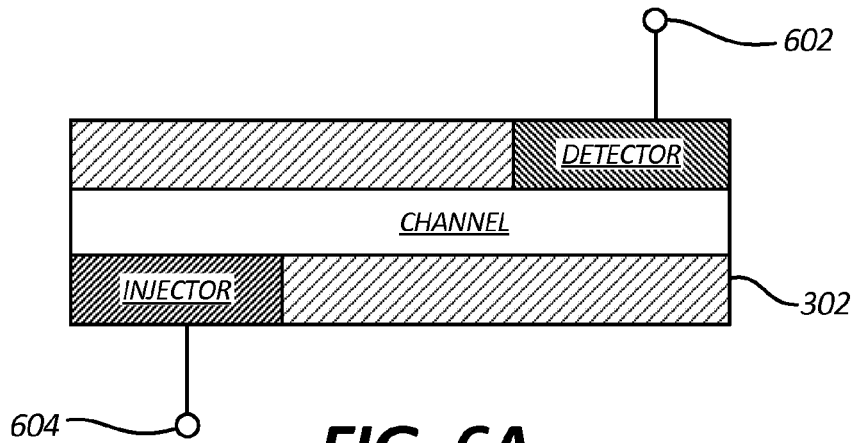
FIGS. 6A, 6B and 6C are schematic diagrams of cross-sections of lateral spin valve readers with different lead terminal configurations.
Figure 6B:
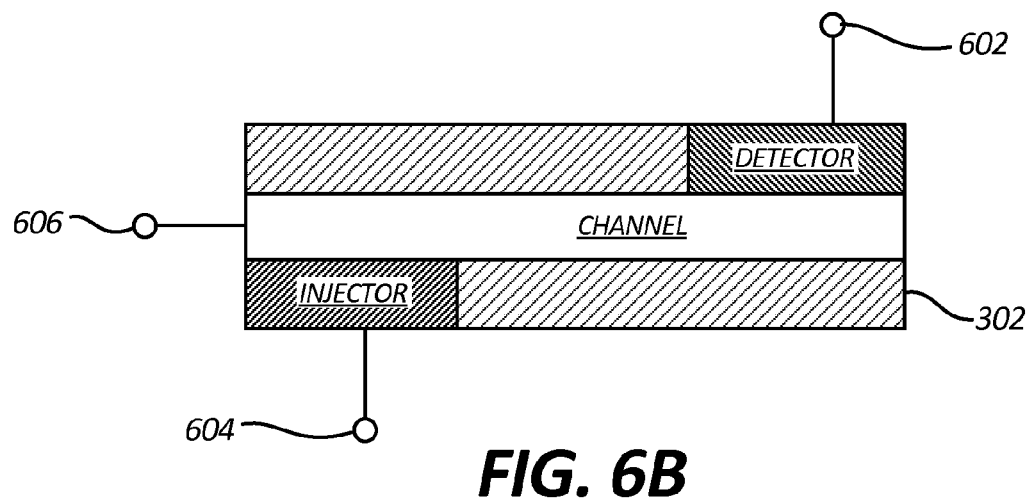
Figure 6C:
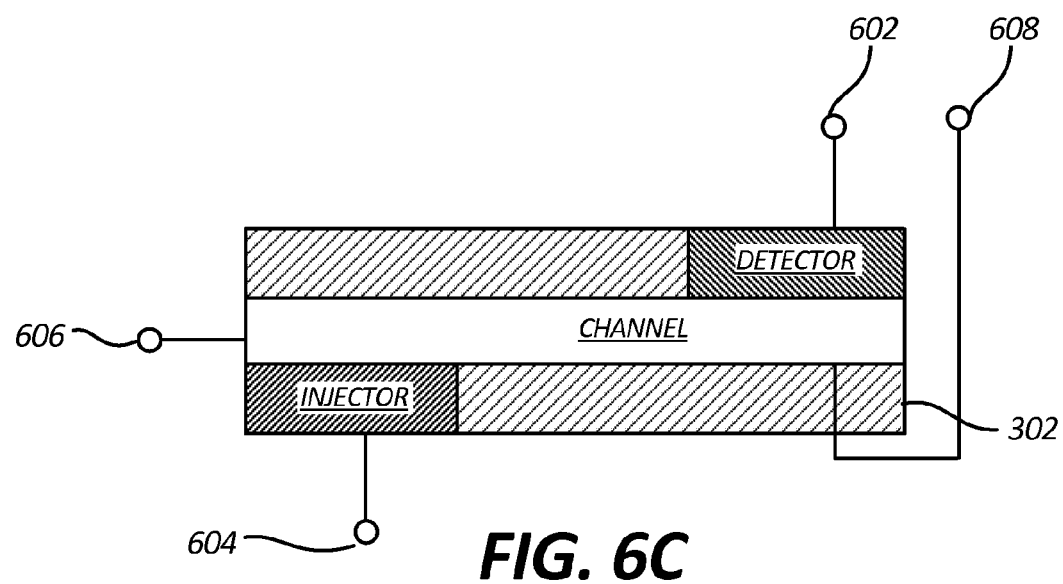

The LSV reader is electrically isolated from any surrounding conductor that may short injector and detector leads (not shown in FIG. 5). Such surrounding conductors may include magnetic shields and/or secondary spin injectors. It is further noted that two, three, four, or any other number of contacts may be implemented in various embodiments of the LSV reader. The contact configuration utilized depends on a type of detection scheme and application. FIG. 6A shows an example of an LSV reader such as 320 that has a two-terminal/two-contact (602 and 604) configuration. FIG. 6B shows an example of an LSV reader 320 that has a three-terminal/three-contact (602, 604 and 606) configuration, and FIG. 6C shows an example a four-terminal/four-contact (602, 604, 606 and 608) configuration.

The choice of dielectric material species is important for the dielectric cladding. Two distinct and simultaneous requirements on the dielectric are made, 1) that the cladding material be of a wide-band gap variety ($E_g$ (energy gap) >3 eV (electron volts), for example) with a sufficient energy offset (i.e. work function) to the metal channel, and 2) that the dielectric constant, $\epsilon_r$, be high (>2$\epsilon_o$). Therefore, a partial list of material classes as well as dielectrics that meet these requirements is given in Table 1 below. Dielectric cladding may be achieved by utilization of wide bandgap semiconductors (polar and non-polar) as well as insulators (e.g. oxides and nitrides) as two distinct classes of materials. Within the framework of those classes, some examples of material species are given in Table 1 below.

TABLE 1

| Select Semiconductors | | Insulators (high dielectric constant (k)) | |
|---|---|---|---|
| Species | $E_g$(eV)/$\epsilon_r$ | Species | $E_g$(eV)/$\epsilon_r$ |
| AlN (Aluminum Nitride) + alloys | 6.2/9 | Al$_2$O$_3$ (Sapphire/ Aluminum Oxide) | 8.8/11 |
| GaN (Gallium Nitride) + alloys | 3.4/8.9 | HfO$_2$ (Hafnium(IV) Oxide) | 6.0/15 |
| GaAs (Gallium Arsenide) + alloys | 1.42/11 | TiO$_2$ (Titanium Dioxide) | 3.2/25 |
| ZnO (Zinc Oxide) + alloys | 3.37/~8 | ZrO$_2$ (Zirconium Dioxide) | 5.8/10-50 |
| Diamond | 5.5/<10 | Si$_3$N$_4$ (Silicon Nitride) | 5.3/7 |
| | | Ta$_2$O$_5$ (Tantalum Oxide) | 4.4/20 |
| | | Titanates (BaTiO$_3$ (Barium Titanate), SrTiO$_3$ (Strontium Titanate), etc.) | 3.7+/100-1000s |

The cladding layer thickness (denoted by reference numeral 342 in FIGS. 3A and 3B) is not limited to the same thickness as the tunnel barrier. On the contrary, it should be of sufficient thickness that the channel mobile electron wave function's evanescent tail that penetrates into the cladding layer vanishes. This requirement depends on the work function between the dielectric and the channel metal. In certain embodiments, a thickness of the exterior cladding may be greater than 3 nanometers (nm) in thickness. In other embodiments, the cladding layer thickness may be slightly less (for example, 2.5-2.9 nm). An upper limit for the thickness the cladding may be about 20 nanometers. However, in different embodiments, cladding of any suitable thickness may be employed. Typical tunnel barrier thicknesses (denoted by reference numeral 340 in FIGS. 3A and 3B) are no more than 1 nm thick. However, in certain embodiments, tunnel barriers having greater thicknesses (for example, 1.5 nm) may be used. A lower limit for tunnel barrier thickness may be about 5 angstroms. Furthermore, the dielectric species of the cladding layer need not be similar to the tunnel barrier material species. This is due to the differing requirements for the respective dielectrics. The dielectric used for LSV channel cladding must confine the electron wave function into the channel region with little "leakage" into the dielectric. Additionally, the dielectric constant should be high such that the electric field of impurity defects is contained in the channel. There may not be similar requirements for the barrier layer. For example, if the tunnel barrier is composed of MgO, then the dielectric cladding layer may be Al$_2$O3, AlN, Si$_3$N$_4$, or any species given in the list above in Table 1. In some embodiments, the cladding may comprise multiple layers, with each layer formed of a different material.

As indicated earlier, the bias configuration for a LSV reader may include 2, 3, or 4 terminals for a single reader. However, in some embodiments, it may be more practical from an implementation standpoint that the reader is either 2-terminal as illustrated in FIG. 6A or 3-terminal as illustrated in FIG. 6B.

Figure 7A:
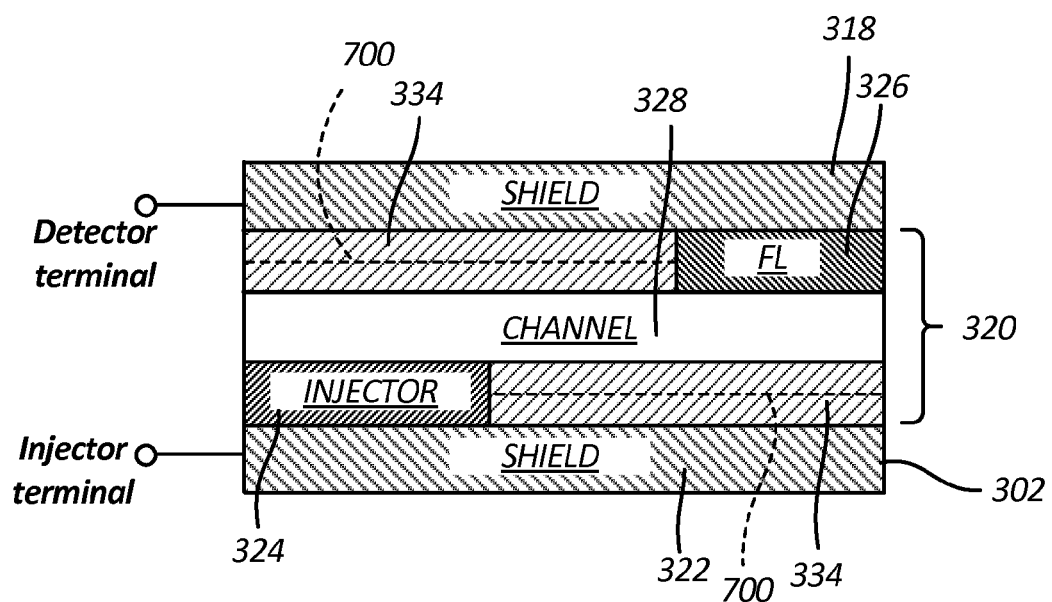
FIGS. 7A, 7B and 7C are diagrammatic illustrations showing different views of a lateral spin valve reader in accordance with one embodiment.
Figure 7B:
Figure 7C:
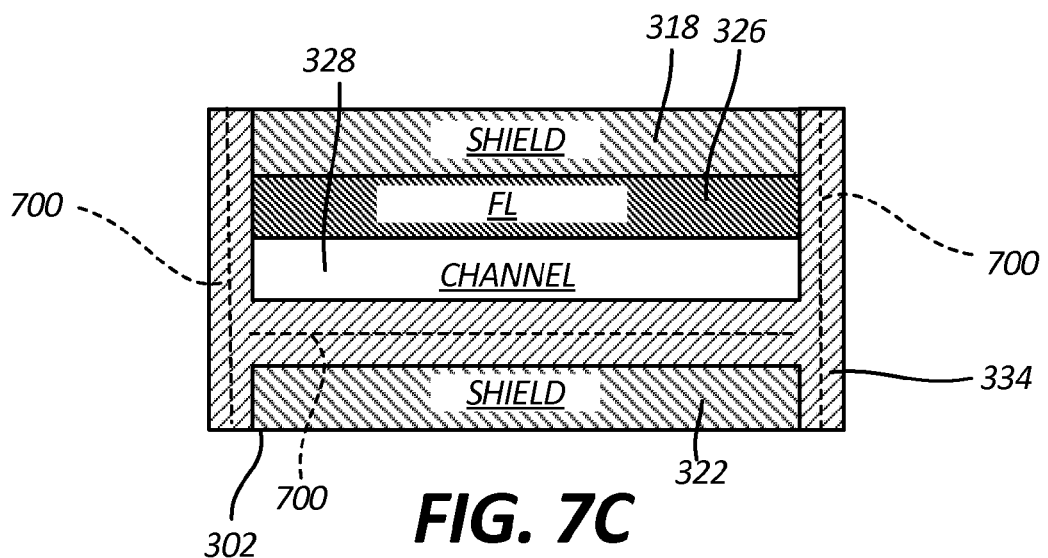

FIGS. 7A, 7B and 7C are cross-sectional, top and bearing surface views, respectively of LSV reader 320 in accordance with one embodiment. Top shield 318 and bottom shield 322, which are not shown in FIG. 5, are shown in FIGS. 7A and 7C. The top view shown in FIG. 7B in with shield 318 excluded. In the embodiment of LSV reader 320 shown in FIGS. 7A, 7B and 7C, cladding 334 may comprise multiple layers, with each of the multiple layers being formed of a different dielectric material. Dashed lines denoted by reference numeral 700 indicate optional multiple layers.

Figure 8:
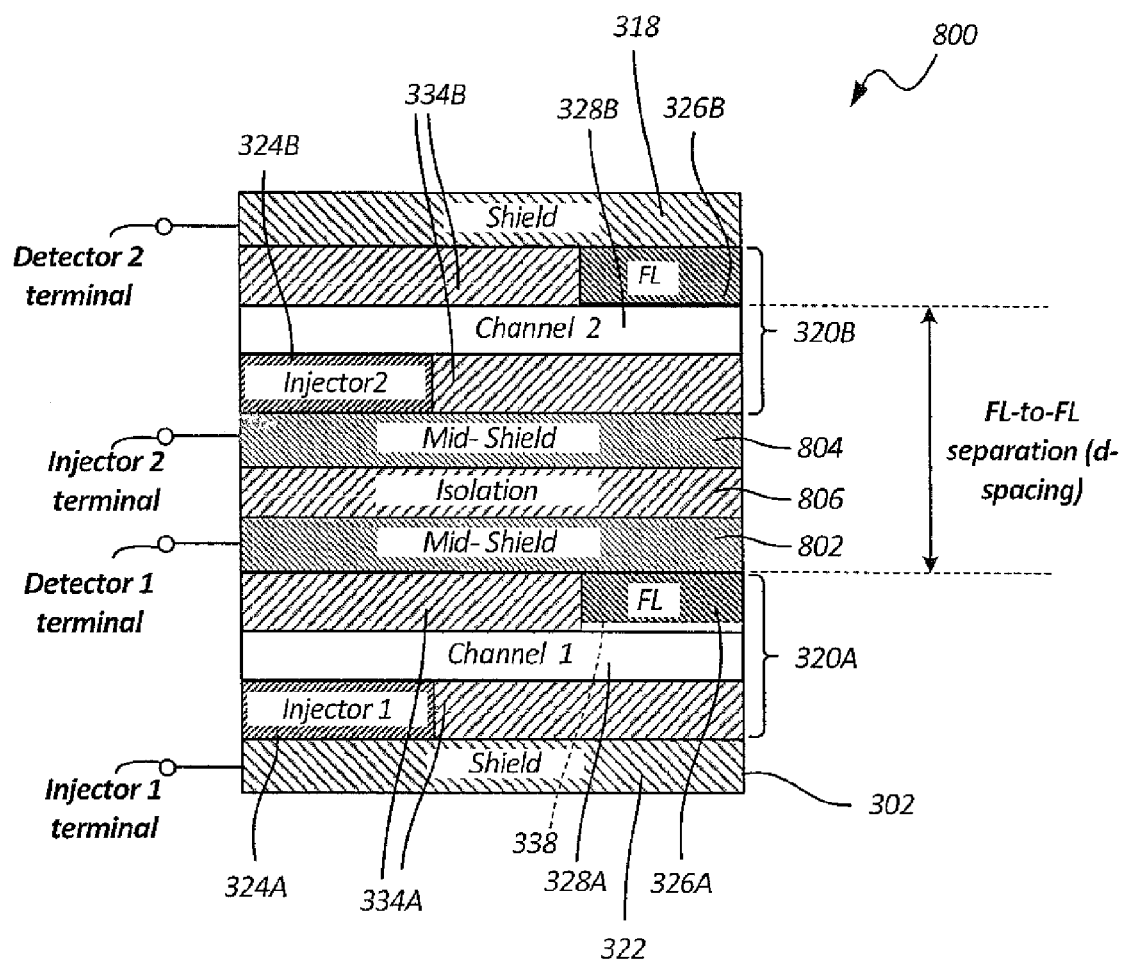
FIG. 8 is a diagrammatic illustration of a cross-section of a multi-sensor reader in accordance with one embodiment.

As indicated earlier in connection with the description of FIGS. 3A and 3B, an LSV reader such as 320 has a substantially narrow shield-to-shield spacing proximate to a bearing surface such as 302. The shield-to-shield spacing in the reader such as 320 is determined substantially by the channel and free layers (FL). Therefore, it is a suitable reader design to implement in a multi-sensor configuration where two or more readers are stacked on top of each other within a single recording head such as 300. An example of a dual-reader configuration is shown in FIG. 8. The embodiment of reader 800 in FIG. 8 includes a top shield 318 a bottom shield 322 and LSV readers 320A and 320B interposed between top shield 318 and bottom shield 322. Reader 320A includes an injector 324A, a detector 326A, a channel 328A and a cladding 334A. Similarly, reader 320B includes an injector 324B, a detector 326B, a channel 328B and a cladding 334B. At least one of the LSV readers 320A and 320B includes a tunnel barrier layer 338 that is formed a material that is different from a material of the exterior cladding 334A, 334B. In the embodiment shown in FIG. 8, a two-terminal connection configuration is used for each shield. Accordingly, bottom shield 322 and a middle shield 802 are utilized for electrical connection to reader 320A. Similarly, a middle shield 804 and top shield 318 are utilized for electrical connection to reader 320B. A suitable isolation layer 806 is interposed between middle shields 802 and 804 to provide the necessary electrical isolation between the shields. It should be noted that FIG. 8 is an illustrative embodiment of a multi-sensor reader and, in other embodiments, more than two sensors may be employed.

In the multi-sensor configuration, a critical parameter is the FL-to-FL spacing, d (in FIG. 8), and is conventionally set by the additive thicknesses of the stack SAF, mid-shields, and isolation layers. Reducing d enables the multi-sensor reader to be implemented in a higher linear density drive. Substantially drastic d-spacing reduction may be achieved by implementing LSV-based magnetic readers because, as noted above, they eliminate the thicknesses of SAF and AFM stacks at the bearing surface that are typically present in, for example, CPP TMR readers.

Figure 9:
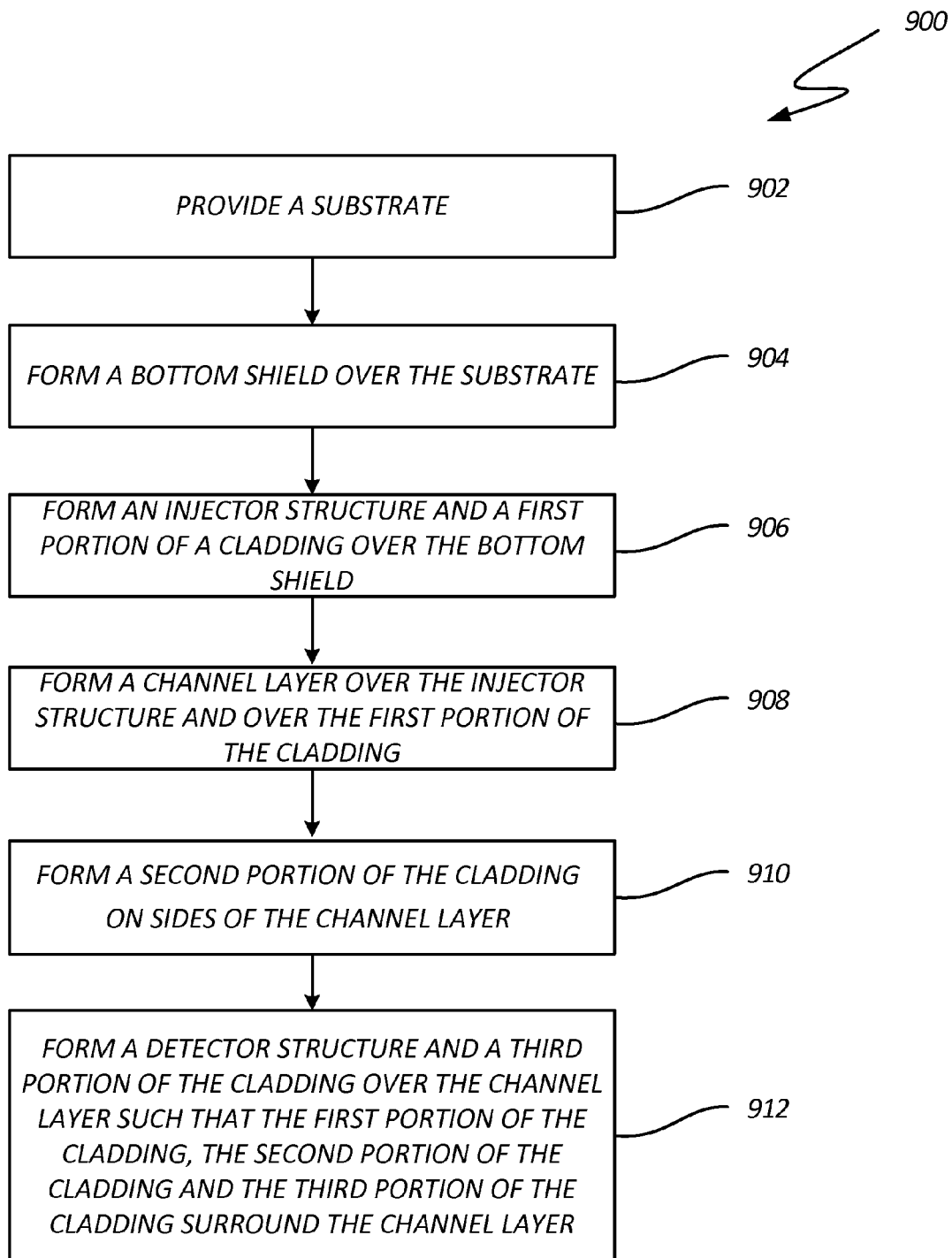
FIG. 9 is a simplified flow diagram of a method embodiment.

FIG. 9 shows a simplified flow diagram 900 of a method forming a recording head in accordance with one embodiment. At step 902, a suitable substrate is provided. At step 904, a bottom shield is formed over the substrate. This is followed by step 906 at which an injector structure and a first portion of a cladding are formed over the bottom shield. At step 908, a channel layer over the injector structure and over the first portion of the cladding. At step 910, a second portion of the cladding is formed on sides of the channel layer. At step 912, a detector structure and a third portion of the cladding are formed over the channel layer such that the first portion of the cladding, the second portion of the cladding and the third portion of the cladding surround the channel layer.

Although various uses of the LSV reader with the cladding to suppress spin-scattering are disclosed in the application, embodiments are not limited to the particular applications or uses disclosed in the application. It is to be understood that even though numerous characteristics and advantages of various embodiments of the disclosure have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the LSV reader with the cladding while maintaining substantially the same functionality without departing from the scope and spirit of the present disclosure. In addition, although the preferred embodiment described herein is directed to particular type of LSV reader with the cladding utilized in a particular data storage system, it will be appreciated by those skilled in the art that the teachings of the present disclosure can be applied to other data storage devices without departing from the scope and spirit of the present disclosure.

What is claimed is:

1. A multi-sensor reader within a single recording head, the multi-sensor reader comprising:
a top shield;
a bottom shield;
a plurality of lateral spin valve readers interposed between the top shield and the bottom shield wherein each of the plurality of lateral spin valve readers comprises:
a detector structure located proximate to a bearing surface;
a spin injection structure located away from the bearing surface;
a channel layer extending from the detector structure to the spin injection structure; and
an exterior cladding, disposed around the channel layer, configured to suppress spin-scattering at surfaces of the channel layer;
first and second mid shields between a first one of the plurality of lateral spin valve readers and a second one of the plurality of lateral spin valve readers; and
an isolation layer between the first mid shield and the second mid shield.

2. The multi-sensor reader of claim 1 and wherein the first one of the plurality of lateral spin valve readers has a two terminal configuration with only a single detector terminal connected to the top shield and only a single injector terminal connected to the first mid shield, and no terminal connected to the channel layer.

3. The multi-sensor reader of claim 1 and wherein at least one of the plurality of lateral spin valve readers comprises a tunnel barrier layer that is formed a material that is different from a material of the exterior cladding.

4. The multi-sensor reader of claim 1 and wherein the exterior cladding comprises at least one of a semiconductor or an insulator.

5. The multi-sensor reader of claim 4 and wherein the semiconductor is selected from the group consisting of AlN, alloys comprising AlN, GaN, alloys comprising GaN, GaAs, alloys comprising GaAs, ZnO, alloys comprising ZnO, Diamond and combinations thereof.

6. The multi-sensor reader of claim 4 and wherein the insulator is selected from the group consisting of $Al_2O_3$, $HfO_2$, $TiO_2$, $ZrO_2$, $Si_3N_4$, $Ta_2O_5$, one or more Titanates and combinations thereof.

7. The multi-sensor reader of claim 6 and wherein the one or more Titanates comprise $BaTiO_3$ and $SrTiO_3$.

8. The multi-sensor reader of claim 1 and further comprising a tunnel barrier layer between at least one of the spin injector structure and the channel layer or the detector structure and the channel layer.

9. The multi-sensor reader of claim 8 and wherein a thickness of the tunnel barrier layer is less than or equal to about 1.5 nanometers.

10. The multi-sensor reader of claim 9 and wherein a thickness of the exterior cladding is greater than or equal to about 2.5 nanometers.

11. The multi-sensor reader of claim 8 and wherein the tunnel barrier layer is formed of a first material and the exterior cladding is formed of a second material that is different from the first material.

12. The multi-sensor reader of claim 11 and wherein the tunnel barrier layer comprises MgO, $Al_2O_3$ or $TiO_2$.

13. The multi-sensor reader of claim 1 and wherein the exterior cladding comprises a bilayer including a first layer comprising a first dielectric material and a second layer comprising a second dielectric material that is different from the first dielectric material.

14. The multi-sensor reader of claim 1 and wherein the exterior cladding comprises at least one of a semiconductor material having an energy gap that is greater than or equal to about one electron volt or an insulator material having an energy gap that is greater than or equal to about three electron volts.

15. The multi-sensor reader of claim 1 and wherein the exterior cladding comprises a material having a dielectric constant that is greater than twice a permittivity of free space.

16. A multi-sensor reader within a single recording head, the multi-sensor reader comprising:
   a top shield;
   a bottom shield; and
   a plurality of lateral spin valve readers interposed between the top shield and the bottom shield wherein each of the plurality of lateral spin valve readers comprises:
      a detector structure located proximate to a bearing surface;
      a spin injection structure located away from the bearing surface;
      a channel layer extending from the detector structure to the spin injection structure; and
      an exterior cladding, disposed around the channel layer, configured to suppress spin-scattering at surfaces of the channel layer,
   wherein a first one of the plurality of lateral spin valve readers has a two terminal configuration with only a single detector terminal connected to the top shield and only a single injector terminal connected to a mid shield between the first one of the plurality of lateral spin valve readers and a second one of the plurality of lateral spin valve readers, and no terminal connected to the channel layer.

17. The multi-sensor reader of claim 16 and wherein the exterior cladding comprises a semiconductor.

18. The multi-sensor reader of claim 17 and wherein the semiconductor is selected from the group consisting of AlN, alloys comprising AlN, GaN, alloys comprising GaN, GaAs, alloys comprising GaAs, ZnO, alloys comprising ZnO, Diamond and combinations thereof.

19. The multi-sensor reader of claim 16 and wherein the exterior cladding comprises an insulator.

20. The multi-sensor reader of claim 19 and wherein the insulator is selected from the group consisting of $Al_2O_3$, $HfO_2$, $TiO_2$, $ZrO_2$, $Si_3N_4$, $Ta_2O_5$, one or more Titanates and combinations thereof.

* * * * *